(12) United States Patent
Horng et al.

(10) Patent No.: US 6,626,577 B1
(45) Date of Patent: Sep. 30, 2003

(54) RADIALLY INNER SURFACE STRUCTURE OF A BEARING

(75) Inventors: Alex Horng, Kaohsiung (TW); Ching-Shen Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 33 days.

(21) Appl. No.: 10/115,908

(22) Filed: Apr. 5, 2002

(51) Int. Cl.⁷ ............................................... F16C 32/06
(52) U.S. Cl. ........................ 384/292; 384/114; 384/279
(58) Field of Search ................... 384/114, 120, 384/276, 279, 286, 291, 292

(56) References Cited

U.S. PATENT DOCUMENTS

| | | | | |
|---|---|---|---|---|
| 1,856,304 A | * | 5/1932 | Whiteley | ................ 384/291 |
| 2,397,124 A | * | 3/1946 | Bufington et al. | ........... 384/292 |
| 4,883,367 A | | 11/1989 | Maruyama | ................ 384/114 |
| 5,289,067 A | | 2/1994 | Tanaka et al. | ............. 310/90.5 |
| 5,415,476 A | * | 5/1995 | Onishi | ........................ 384/114 |
| 5,630,953 A | * | 5/1997 | Klink | ..................... 219/121.69 |
| 6,494,621 B2 | * | 12/2002 | Markovitch | ................ 384/292 |

* cited by examiner

Primary Examiner—Thomas R. Hannon
(74) Attorney, Agent, or Firm—Bacon & Thomas, PLLC

(57) ABSTRACT

The radially inner surface structure of the bearing in accordance with the present invention mainly comprises a pair of guiding groove sets and a plurality of convergent points thereof. The guiding groove sets are individually extended clockwise and counterclockwise from either end and terminating in a vicinity of a corresponding end to define a plurality of convergent points. The guiding groove sets are intersected in a predetermined angle and each guiding groove set is consisted of a plurality of guiding grooves arranged in parallel.

6 Claims, 3 Drawing Sheets

RADIALLY INNER SURFACE STRUCTURE OF A BEARING

BACKGROUND OF THE INVENTION

1. Field of the Invention

The present invention is related to a radially inner surface structure of a bearing and more particularly to a pair of guiding groove sets extending clockwise and counterclockwise on the radially inner surface from either end of the oil-impregnated bearing and terminating in the vicinity of a corresponding end to define a plurality of convergent points. Lubricant in each guiding groove set is guided to flow to the convergent points of the bearing at which the lubricant has been formed a plurality of convergent lubricant points. Lubricant of convergent lubricant points may spread into the guiding groove sets and thus these some lubricant return to the lubricant points such that the two guiding sets perform dynamically circulating lubricant.

2. Description of the Related Art

A traditional oil-impregnated bearing utilizes lubricant to maintain lubricity on its radially inner surface for reducing friction. Thus, there exists a main need to improve for reducing inner lubricant leakage and friction increased by inadequate inner lubricant. Currently, a washer is available to cover on either end of a bearing in order to reduce or prevent inner lubricant from leakage. However, the washer is incapable of effectively preventing the bearing from inner lubricant leakage. Many other techniques for retaining inner lubricant have evolved over the years.

U.S. Pat. No. 4,883,367, issued on Nov. 28, 1989 to Maruyama, U.S. Pat. No. 5,289,067, issued on Feb. 22, 1994 to Tanaka, and U.S. Pat. No. 6,023,114, issued on Feb. 8, 2000 to Mori, disclose a variety of guiding grooves provided on an inner surface of a oil-impregnated bearing, so as to dynamically balance entire pressure of inner lubricant. However, these guiding grooves is also incapable of guiding outer lubricant from one end of a bearing to the other end to form convergent lubricant points which can support rotation of a shaft. Meanwhile, inner lubricant leakage still occurs at the two end of the oil-impregnated bearing.

Certainly, all oil-impregnated bearings cannot absolutely avoid occurrence of inner lubricant leakage. The oil-impregnated bearing can be compensated for inner lubricant leakage if outer lubricant is guided into an interior of the bearing. In this regard, two ends of the oil-impregnated bearing are necessary to form a guiding structure through which connects to the interior for supplying lubricant instead of inner lubricant leakage.

The present invention intends to provide a pair of guiding groove sets extending clockwise and counterclockwise on a radially inner surface of an oil-impregnated bearing from either end and terminating in a vicinity of a corresponding other end to define a plurality of convergent points. The two guiding groove sets in accordance with the present invention are used to guide outer lubricant to an interior of the bearing to form convergent lubricant points in such a way to mitigate and overcome the above problem.

SUMMARY OF THE INVENTION

The primary objective of this invention is to provide a radially inner surface structure of a bearing comprising a pair of guiding groove sets extending clockwise and counterclockwise from either end and terminating in a vicinity of a corresponding end to define a plurality of convergent points, which supplies outer lubricant into an interior of the bearing to maintain its lubricity.

The secondary objective of this invention is to provide the radially inner surface structure of the bearing comprising a plurality of convergent points to form convergent lubricant for supporting a shaft.

The another objective of this invention is to provide the radially inner surface structure of the bearing comprising a pair of guiding groove sets and a plurality of convergent points thereof so as to dynamically circulate inner lubricant.

The present invention is a radially inner surface structure of a bearing. The radially inner surface structure of the bearing mainly comprises a pair of guiding groove sets and a plurality of convergent points thereof. The guiding groove sets are individually extended clockwise and counterclockwise from either end and terminating in a vicinity of a corresponding end to define a plurality of convergent points. The guiding groove sets are intersected in a predetermined angle and each guiding groove set is consisted of a plurality of guiding grooves arranged in parallel.

Other objectives, advantages and novel features of the invention will become more apparent from the following detailed description and the accompanying drawings.

BRIEF DESCRIPTION OF THE DRAWINGS

The present invention will now be described in details with references to the accompanying drawings herein.

DETAILED DESCRIPTION OF THE INVENTION

Figure 1:
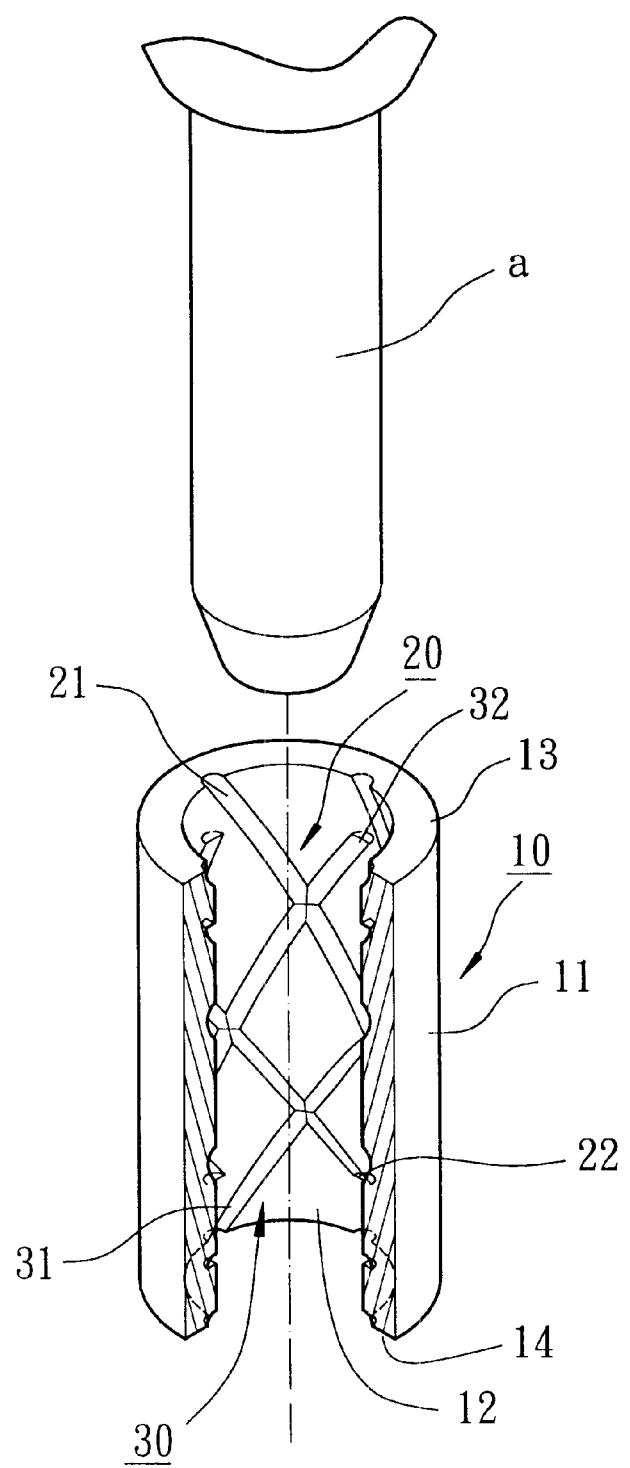
FIG. 1 is an exploded perspective view of a shaft and a bearing in accordance with a first embodiment of the present invention.

Referring now to the drawings, there are two embodiments of the present invention shown therein, which include generally a primary shaft member and a secondary bearing member.

Figure 2:
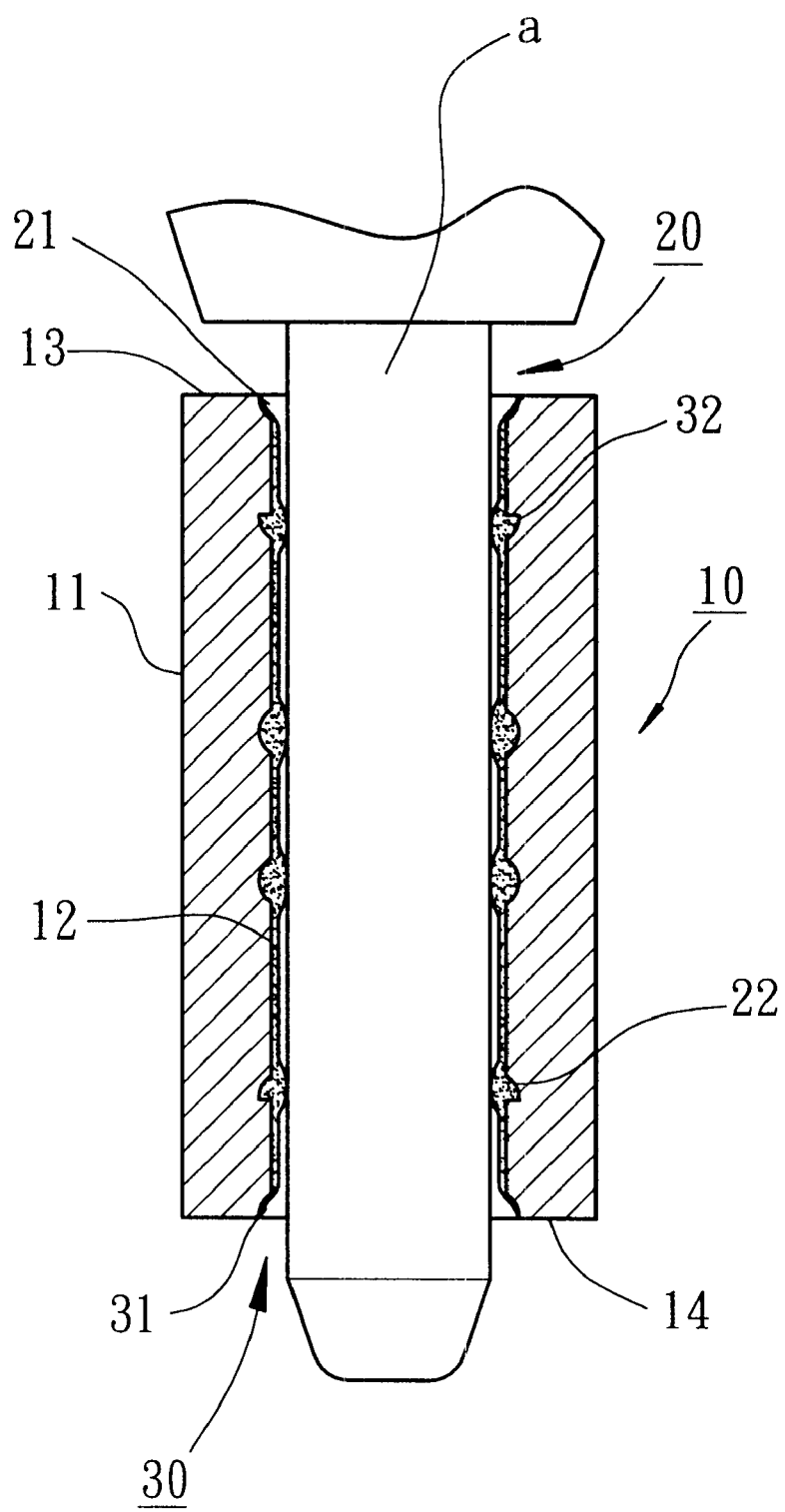
FIG. 2 is a partial cross-sectional view of the shaft and the bearing in accordance with the first embodiment of the present invention.
Figure 3:
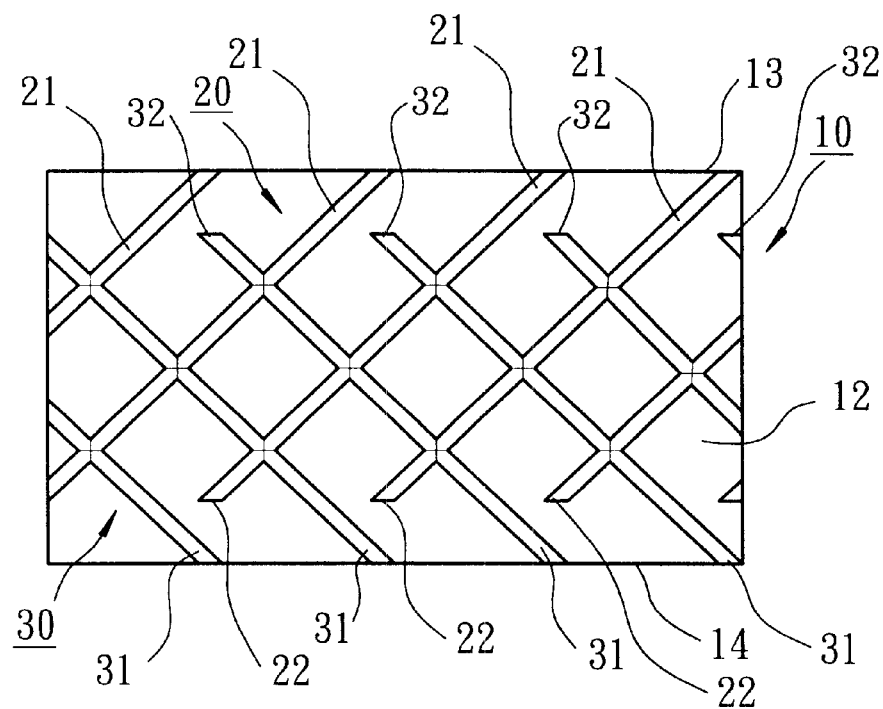
FIG. 3 is a schematic diagram of a radially inner surface of the bearing in accordance with the first embodiment of the present invention.

Referring initially to FIGS. 1 through 3, an oil-impregnated bearing 10 in accordance with the present invention mainly includes a first guiding groove set designated as numeral 20 and a second guiding groove set designated as numeral 30. Much of the other detailed structure of the oil-impregnated bearing 10 is omitted. The oil-impregnated bearing 10 is adapted to rotatably receive a shaft designated as reference symbol (a).

Construction of the oil-impregnated bearing 10 shall be described in detail, referring now to FIGS. 1 and 2. The oil-impregnated bearing 10 in accordance with the first embodiment of the present invention generally includes a radially outer surface 11, a radially inner surface 12, a first distal end 13 and a second distal end 14. The bearing 10 further comprises a first guiding groove set 20 and a second guiding groove set 30. The first guiding groove set 20 is consisted of a plurality of first guiding grooves 21 extended in parallel and starts from the first distal end 13 and terminates in the vicinity of the second distal end 14 to define first convergent points 22. Similarly, the second guiding groove set 30 is consisted of a plurality of second guiding grooves 31 extended in parallel from the second distal end 14 and terminated in the vicinity of the first distal end 13 to define second convergent points 32. The first guiding groove set 20 is spiraled in clockwise with respect to its axis while the second guiding groove set 30 is spiraled in counterclockwise. The guiding groove sets 20 and 30 are intersected in a predetermined angle to thereby define a plurality of third convergent points (not labeled).

Referring back to FIG. 2, a gap is formed between the bearing 10 and the shaft a. The inner lubricant is spread in the gap so that the shaft (a) is smoothly in contact with the inner surface 12 of the bearing 10 and such that friction therebetween is reduced. Meanwhile, some inner lubricants are filled in the guiding groove sets 20 and 30 to reservoir in them. The inner lubricant filled in the guiding grooves 21 and 31 are simultaneously forced to flow along its longitudinal direction and to form a plurality of lubricant convergent points at the convergent points while the shaft rotating. The outer lubricant is sucked into the gap via opening ends defined on the two distal ends 13 and 14 and then converged at convergent lubricant points defined at intersection of the first guiding groove 21 and the second guiding groove 31. Some other inner lubricants are converged at convergent lubricant points defined in termination of the first guiding groove 21 and the second guiding groove 31. These convergent lubricant points support the rotating shaft (a) that it can maintain indirect friction the inner surface of the bearing 10 with the shaft (a).

Intersection of the guiding groove sets 20 and 30 shall be described in detail, referring now to FIG. 3. The guiding grooves 21 and 31 have inclined angles with 45° with respect to the distal end 13 and 14 of the bearing 10 and thus the intersection of the guiding grooves 21 and 31 defines an angle with 90°. The convergent lubricant points 22 of the guiding grooves 21 are located in the vicinity of the distal end 14 so as to approximate to the guiding grooves 31 for entirely circulating lubricant in the bearing 10. Similarly, the convergent lubricant points 32 of the guiding grooves 31 are located in the vicinity of the distal end 13 so as to approximate to the guiding grooves 21.

Figure 4:
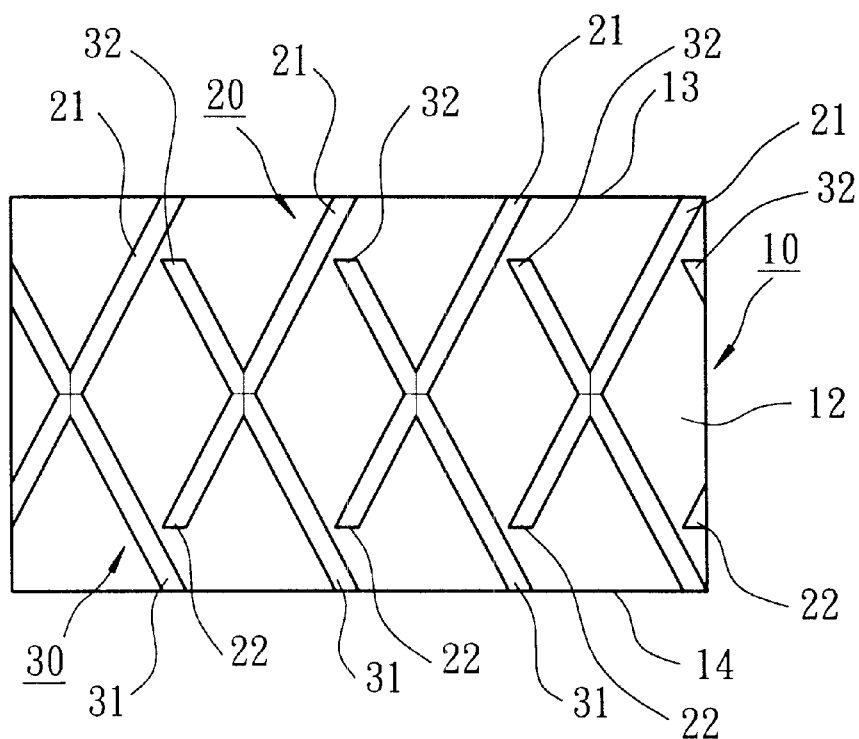
FIG. 4 is a schematic diagram of a radially inner surface of the bearing in accordance with a second embodiment of the present invention.

Referring to FIG. 4, reference numerals of the second embodiment have applied the identical numerals of the first embodiment. The bearing 10 of the second embodiment has the similar configuration and same function as the first embodiment and the detailed descriptions are omitted. The guiding grooves 21 and 31 have inclined angles with 60° with respect to the distal end 13 and 14 of the bearing 10 and thus the intersection of the guiding grooves 21 and 31 defines an angle with 120°.

Although the invention has been described in details with references to its presently preferred embodiment, it will be understood by one of ordinary skill in the art that various modifications can be made without departing from the spirit and the scope of the invention, as set forth in the appended claims.

What is claimed is:

1. A radially inner surface structure of a bearing comprising:

a first guiding groove set including a plurality of first guiding grooves extending from a first distal end of the bearing and terminating in the vicinity of a second distal end of the bearing being adapted to define a plurality of first convergent points; and a second guiding groove set including a plurality of second guiding grooves extending from the second distal end and terminating in the vicinity of the first distal end being adapted to define a plurality of second convergent points;

wherein the first guiding groove and the second guiding groove have lubricants to flow to the convergent points to form a plurality of convergent lubricant points being adapted to support a shaft receiving in the inner surface of the bearing.

2. The radially inner surface structure of a bearing as defined in claim 1, wherein the first guiding groove set and the second guiding groove set are intersect to define a plurality of third convergent points to form convergent lubricant points being adapted to support the shaft.

3. The radially inner surface structure of a bearing as defined in claim 1, wherein the guiding grooves are extended in clockwise or counterclockwise.

4. The radially inner surface structure of a bearing as defined in claim 2, wherein the intersection of the guiding grooves defines an angle with 60°.

5. The radially inner surface structure of a bearing as defined in claim 2, wherein the intersection of the guiding grooves defines an angle with 120°.

6. The radially inner surface structure of a bearing as defined in claim 1, wherein the convergent lubricant points of the guiding grooves are located in the vicinity of the distal ends so as to approximate to the guiding grooves for entirely circulating lubricant in the bearing.

* * * * *